United States Patent
Willson et al.

(10) Patent No.: US 11,502,618 B2
(45) Date of Patent: Nov. 15, 2022

(54) DC PHOTOVOLTAIC INPUT EMULATION USING AN AC GENERATOR SOURCE

(71) Applicant: NeoVolta, Inc., Poway, CA (US)

(72) Inventors: Brent Willson, San Diego, CA (US); Michael Horan, Las Vegas, NV (US)

(73) Assignee: NEOVOLTA, INC., Poway, CA (US)

( * ) Notice: Subject to any disclaimer, the term of this patent is extended or adjusted under 35 U.S.C. 154(b) by 156 days.

(21) Appl. No.: 17/175,249

(22) Filed: Feb. 12, 2021

(65) Prior Publication Data
US 2022/0263427 A1    Aug. 18, 2022

(51) Int. Cl.
| H02M 1/08 | (2006.01) |
| H02M 1/42 | (2007.01) |
| H02J 3/38 | (2006.01) |
| H02M 7/217 | (2006.01) |
| H02S 40/32 | (2014.01) |

(52) U.S. Cl.
CPC .............. H02M 7/217 (2013.01); H02J 3/381 (2013.01); H02M 1/08 (2013.01); H02M 1/4208 (2013.01); H02S 40/32 (2014.12); H02J 2300/26 (2020.01)

(58) Field of Classification Search
CPC .... H02J 3/381; H02J 2300/26; H02M 1/4208; H02S 40/32
See application file for complete search history.

(56) References Cited

U.S. PATENT DOCUMENTS

| 10,998,730 | B1* | 5/2021 | Willson | H02S 40/32 |
| 2010/0157632 | A1* | 6/2010 | Batten | H02M 7/4807 363/74 |
| 2010/0157638 | A1* | 6/2010 | Naiknaware | H02M 7/4807 363/131 |
| 2012/0205974 | A1* | 8/2012 | McCaslin | H02J 3/46 307/18 |

(Continued)

FOREIGN PATENT DOCUMENTS

| CN | 105610333 A | * | 5/2016 | | H02J 3/383 |
| CN | 108964097 A | * | 12/2018 | | H02J 3/24 |

(Continued)

OTHER PUBLICATIONS

Texas Instruments—Buck PFC Controller Datasheet, May 2011—Revised Jun. 2011.

(Continued)

*Primary Examiner* — Sisay G Tiku
(74) *Attorney, Agent, or Firm* — ArentFox Schiff LLP (57) ABSTRACT

DC supply circuitry is disclosed to supply DC power from an AC source to a DC PV panel input associated with a PV energy storage system (ESS) inverter system. The DC power may be supplied in accordance with a DC current and DC voltage. The DC PV panel input may function by adjusting the drawn current that is supplied by the DC supply circuitry based upon changes in the load, e.g. battery charging. The DC supply circuitry may function to adjust the supplied DC voltage in accordance with changes in the drawn current using a corresponding point on a predetermined DC voltage (Continued)

current-voltage characteristic (I-V) curve. The predetermined I-V curve may represent an ideal I-V curve associated with a DC PV panel system that is compatible with the PV ESS inverter system, thereby allowing for the use of DC PV panel inputs that may typically go unused.

20 Claims, 8 Drawing Sheets

(56) References Cited

U.S. PATENT DOCUMENTS

| | | | |
|---|---|---|---|
| 2012/0215372 A1* | 8/2012 | Kernahan | H02S 50/10 700/297 |
| 2015/0303687 A1 | 10/2015 | Yseboodt et al. | |
| 2016/0111918 A1 | 4/2016 | Benson | |
| 2017/0163042 A1* | 6/2017 | Naiknaware | H02M 7/44 |
| 2019/0267819 A1* | 8/2019 | Paek | H02S 50/00 |

FOREIGN PATENT DOCUMENTS

| | | | | |
|---|---|---|---|---|
| EP | 2773036 A1 * | 9/2014 | | H02J 3/28 |
| EP | 3410551 A1 * | 12/2018 | | H02J 1/102 |
| EP | 3449543 B1 * | 9/2020 | | H02J 3/381 |
| KR | 20190097896 A | 8/2019 | | |
| WO | WO-2016074649 A1 * | 5/2016 | | G05F 1/67 |
| WO | WO-2016100406 A1 * | 6/2016 | | H02J 3/32 |
| WO | WO-2021014449 A1 * | 1/2021 | | |

OTHER PUBLICATIONS

Artesyn AIF-PFC Series Datasheet—Advanced Energy, Sep. 2019.
Notification of Transmittal of the International Search Report and the Written Opinion of the International Searching Authority, or the Declaration dated Apr. 14, 2022—PCT/US 2021/065074.

* cited by examiner

FIG. 7

DC PHOTOVOLTAIC INPUT EMULATION USING AN AC GENERATOR SOURCE

TECHNICAL FIELD

Aspects described herein generally relate to photovoltaic (PV) systems and, more particularly, to PV systems that utilize an AC generator source to couple a DC voltage to a DC PV input used by a PV panel power system in place of PV panels.

BACKGROUND

Conventional solar battery systems are typically configured to operate in accordance with both AC and DC PV panels, each generating AC and DC power, respectively, that is provided to separate power inverter inputs to supply the PV panel power system with PV-generated power. Often times, such PV systems have several AC and DC PV inputs. With respect to the DC PV inputs, one or more of these often go unused, meaning a potential power input remains unutilized.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In today's market it is common for businesses and homes to utilize solar energy, and the alternative energy market has generated a need for localized energy storage. The most common electrical energy storage devices incorporate batteries. Solar energy is among the top alternative energy technology that is currently being utilized, and is most common in the residential and small to medium sized businesses. Solar panels, otherwise referred to as PV panels, form a fundamental part of solar energy systems, and can be incorporated as stand-alone parts that deliver DC power (i.e., via DC PV panels, otherwise referred to as DC solar panels), as well as those that implement integrated micro-inverters to deliver AC power (i.e., via AC PV panels, otherwise known as AC solar panels). However, although the energy storage devices accept PV power from both AC and DC PV sources, any AC power needs to be converted to DC power to charge the system batteries.

Most new installations utilize DC solar panels, while some legacy installations (as well as a smaller amount of new installations) utilize AC solar panels. In any event, it is common for installations to include several DC PV inputs, with some being unused as noted above. Regardless of the type of PV panels that are implemented within the PV panel power system, each PV panel needs to interface with AC utility power connections, the storage batteries, and the end user load connection. To do so, PV panel power systems include a PV energy storage system (ESS) inverter system, which may alternatively be referred to as a main or primary inverter that handles the overall control of the PV panel power system. The aspects described herein are directed to DC supply circuitry that functions as an interface between a source of AC power, such as a generator for instance, and such PV ESS inverter systems to supply the DC PV inputs with a source of DC power in addition to or instead of DC PV panels.

Again, the PV main inverter of PV ESS inverter system may include both AC PV inputs and DC PV inputs (alternately referred to herein as AC PV panel inputs and DC PV panel inputs, respectively). The DC PV inputs are typically used for receiving DC power from the DC PV panels, and thus when DC PV panels are not present in a particular PV panel power system these inputs often remain unused, with a potential source of power to the system being unutilized. DC PV inputs are generally integrated as part of a PV ESS inverter system that regulates the DC power received via the connected DC PV panels to ensure that the DC power is utilized in the most efficient manner. Generally, these regulation techniques include pulse-width modulation (PWM) control and/or maximum power point tracking (MPPT) control. Therefore, existing DC PV inputs are incompatible with standard AC to DC converters. This is due to the PV ESS inverter system regulation systems drawing an amount of current that typically places the AC to DC converters into a fault or protective state (e.g. short circuit protection, foldback, etc.), which does not occur when the source of DC power supplied to the DC PV inputs is an actual DC PV panel.

The aspects described herein address this issue and facilitate the use of AC to DC converter circuitry that implements DC supply circuitry to enable an AC source to provide AC power to an AC to DC converter, which uses DC supply circuitry to supply DC power to unused DC PV panel inputs. To do so, the aspects described herein utilize DC supply circuitry that supplies the DC power in accordance with a DC current and a DC voltage. The DC PV panel input may function by adjusting the drawn current that is supplied by the DC supply circuitry based upon changes in the load, e.g. battery charging, using the aforementioned regulation techniques (e.g. PWM, MPPT, etc.) to ensure the best efficiency when doing so. In response, the DC supply circuitry may adjust the supplied DC voltage in accordance with the drawn current using a corresponding DC voltage point on a predetermined current-voltage characteristic (I-V) curve. The predetermined I-V curve may represent an ideal I-V curve associated with a DC PV panel system that is compatible with the PV ESS inverter system. The supplied DC power may then be used by the PV system for battery charging and/or to deliver power to a load that forms part of a PV panel power system.

General Operation of a PV Panel Power System

Figure 1:
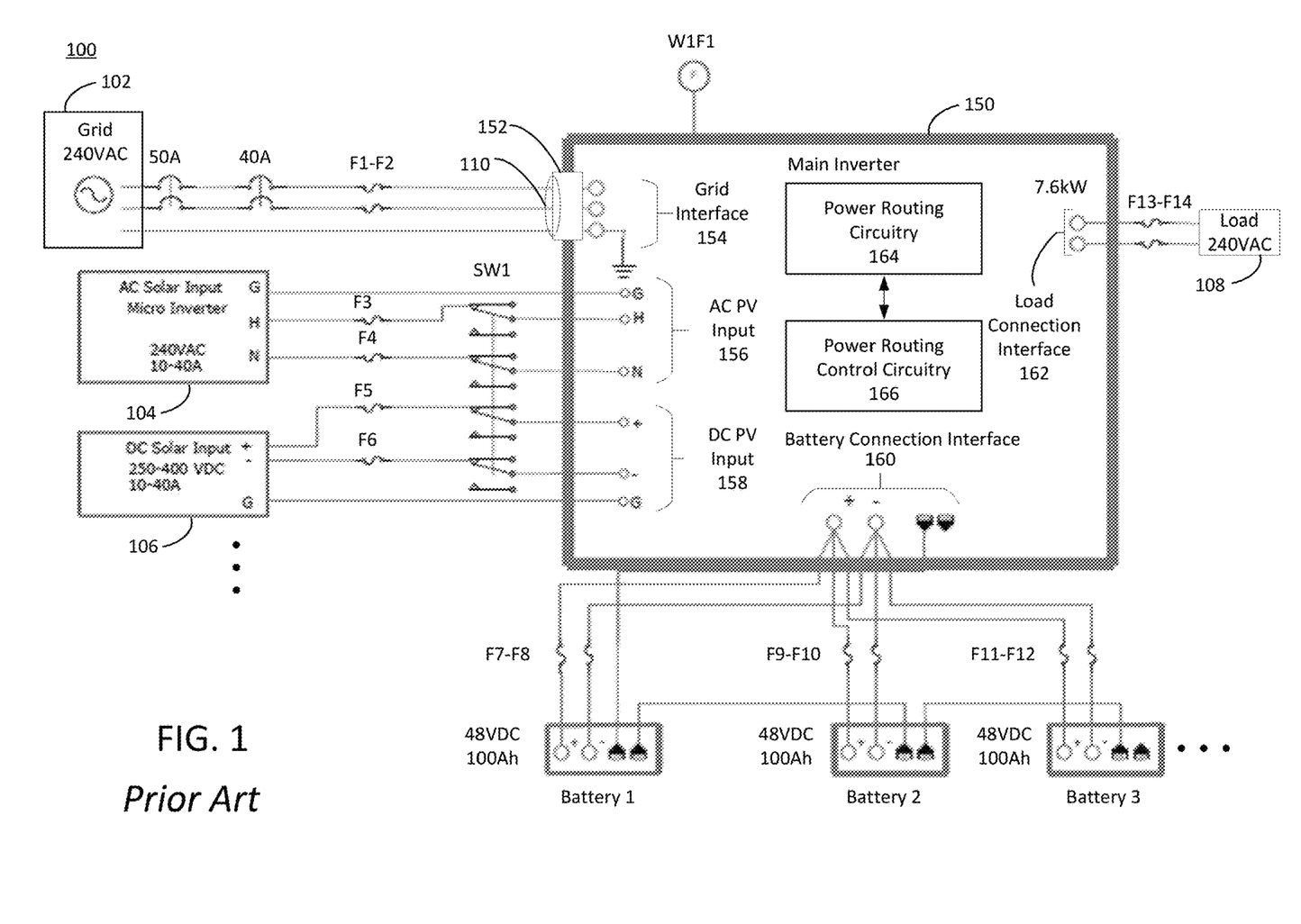
FIG. 1 illustrates a schematic illustration of an example photovoltaic (PV) panel power system as known in the art.

FIG. 1 illustrates a schematic illustration of an example photovoltaic (PV) panel power system as known in the art. As shown in FIG. 1, the PV panel power system 100 includes a main inverter 150, which functions as an interface between the AC PV panel interface 104, the DC PV panel interface 106, the batteries, the grid 102, and the load 108. The AC PV panel interface 104 and the DC PV panel interface 106 may represent a connection to the AC PV input 156 and the DC PV input 158, respectively, each being associated with any suitable number of AC PV panels and DC PV panels, respectively. For example, typical solar panel power systems include about 6-30 solar panels depending upon a particular application and power requirements. Continuing this example, the one or more AC PV panels may include a micro-inverter, which may be associated with a single AC PV panel or more than one AC PV panel. In any event, each of these micro-inverters may be connected in parallel with one another to form the AC PV panel interface 104, which is coupled to the AC PV input 156 of the main inverter 150. Furthermore, the output of any suitable number of DC PV panels may be connected in series with one another, with the maximum voltage remaining below a maximum input rating for the MPPT used by the main inverter 150. Additional (e.g. 2) "strings" may then be connected in parallel if the current rating of a DC PV panel is low enough. Regardless of the specific configuration and/or DC PV panel interconnections, the aggregation of the DC PV panels form the DC PV panel interface 106, which is coupled to the DC PV input 158 of the main inverter 150.

The main inverter 150 may function to independently route AC and DC power from the AC and/or DC PV panel sources to various interconnected components associated with the PV panel power system 100. The main inverter 150 may do so in a concurrent manner. For example, the main inverter 150 may route power from the AC PV panels to the load 108, while at the same time routing DC power from the DC PV panels to charge the batteries.

To do so, the main inverter 150 may also include power routing circuitry 164, which functions to convert (when necessary), condition, and route the supplied AC and DC PV voltages amongst the various components of the PV panel power system 100. For example, with respect to the DC PV panels, the power routing circuitry 164 may convert the DC voltage received via the DC PV input 158 to a regulated and controlled voltage used to supply power to the main inverter 150. The power routing circuitry 164 may also be configured to convert the regulated DC voltage to an AC voltage (e.g., via additional inverter components not shown in FIG. 1 but further discussed below) that is delivered to the load 108 to provide power to the load 108 via the load connection interface 162. Moreover, the power routing circuitry 164 may utilize the regulated DC voltage to charge the batteries.

As further discussed below, to facilitate this functionality the power routing circuitry 164 may be comprised of one or more relays, switches, AC-DC converters, DC-AC inverters, DC-DC converters, regulators, etc., which are not shown in detail in FIG. 1 for purposes of brevity. Additionally, the main inverter 150 may implement the power routing control circuitry 166, which may include any suitable number and/or type of processors, hardware, and/or software that may work in conjunction with one another or independently. For instance, the power routing control circuitry 166 may include memory storing programmable instructions that may be executed via any suitable number and/or type of hardware processors (e.g., an application specific integrated circuit (ASIC), a complex programmable logic device (CPLD), field programmable gate arrays (FPGAs), etc. To provide an illustrative example, the power routing control circuitry 166 may represent one or more processors storing firmware configured to execute, in conjunction with processing circuitry, the various DC power regulation techniques described herein with respect to the main inverter 150.

For example, the power routing circuity 164 may be configured to monitor the status of various operating parameters associated with the PV panel power system 100. Additionally or alternatively, the power routing control circuitry 166 may communicate with and/or control the various components implemented via the power routing circuity 164. In this way, the power routing circuitry 164 and the power routing control circuitry 166 may work in conjunction with one another to ensure that power is routed from the utility grid 102, the AC PV input 156, and the DC PV input 158 to the appropriate components of the PV panel power system 100 at the appropriate time and under the appropriate conditions.

To do so, the power routing control circuitry 166 may further include, for instance, sensors, couplers, power sampling devices, etc., which may be configured to measure and/or track various operating parameters of one or more components of the PV panel power system 100. These operating parameters may include, for instance, the voltage, current, power, amplitude, frequency, etc., of inputs, outputs, and/or power generated via one or more components of the power routing circuity 164 and/or the main inverter 150. As additional examples, and as further discussed herein, these operating parameters may be associated with, for instance, the AC voltage and/or AC current received via the AC PV input 156, the DC voltage and/or DC current received via the DC PV input 158, the status and/or capacity of the batteries, the status of the utility grid power 102, the status of the power delivered to the load 108, the status of the input and/or output associated with AC-DC converters and/or DC-AC inverters implemented as part of the power routing circuity 164, etc. Thus, aspects include the power routing control circuitry 166 being coupled to various components of the power routing circuitry 164, which may be controlled and/or monitored via the use of control and/or data signals carried via appropriate signal interconnections (e.g. wired buses). These specific interconnections, as well as the components used to monitor the status of the various components of the PV panel power system 100, are not shown in FIG. 1 for purposes of brevity. The status monitoring and operation of the main inverter 1250 may be performed in accordance with any suitable techniques, including known techniques.

Moreover, because the main inverter 150 may potentially place solar-generated AC power onto the grid 102 when selling power back to the utility company, the main inverter 150 implements monitoring and safety measures, which are facilitated via the power routing circuity 164 and the power routing control circuitry 166. These safety features ensure that AC power is not supplied to the grid 102 in a power outage situation to protect maintenance workers. For example, although the AC solar panel supplied voltage may be coupled to the utility grid power 102 when power is being sold back to the utility company, the auto-transfer switch 152 functions to otherwise isolate, or "island" the PV panel power system 100 from the utility grid power 102 as a safety measure. In an aspect, in the event of power outage, the power routing control circuitry 166 may control the state of the auto-transfer switch 152 to prevent AC power that is generated via the AC solar panels from being placed onto the grid 102 via a utility line interface 110.

Furthermore, in the event of such a power outage, aspects include the main inverter 150 supplying power to the load 108. This may be accomplished, for instance, via the power routing circuitry 164 coupling generated solar power from the AC PV input 156 to the load 108, coupling generated solar power from the DC PV input 158 to the load 108 (after DC-AC inversion), and/or coupling power from the batteries to the load 108 using the stored battery energy (after DC-AC inversion). Again, in any event, the auto-transfer switch 152 remains open to keep utility personnel safe during the power outage. When utility power is restored, the power routing control circuitry 166 switches over to utility power by closing the auto-transfer switch 152.

Supplying Power to the DC PV Inputs

Figure 2:
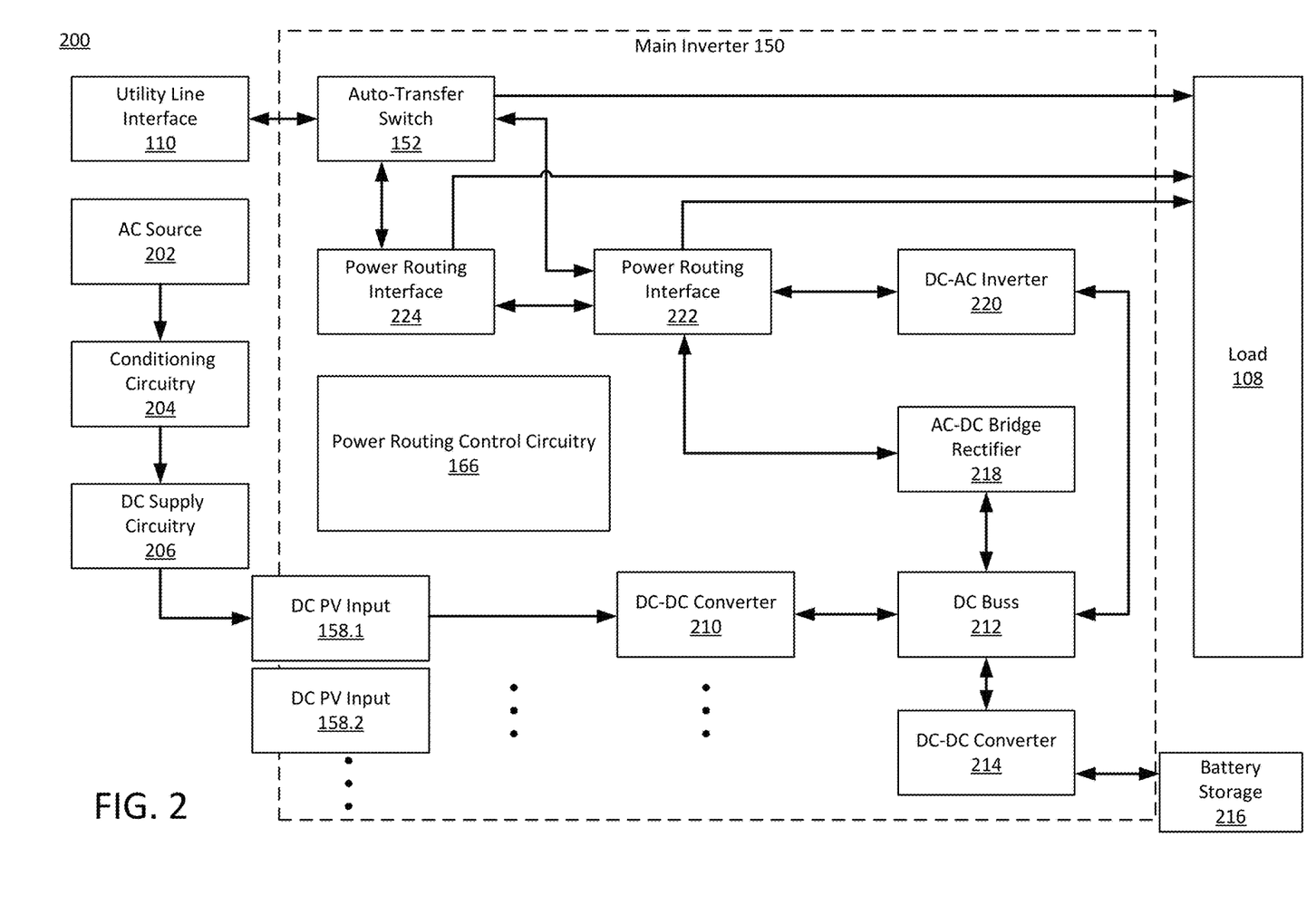
FIG. 2 illustrates a block diagram of an example PV panel power system 200 and power flow, in accordance with one or more aspects of the disclosure.

The PV panel power system 200 and various components as shown in FIG. 2 may be identified with the PV panel power system 100 and the various components as shown in FIG. 1, with additional detail and components shown in FIG. 2 as further discussed herein. The aspects as described herein are primarily directed to the various components of the PV panel power system 200 that may be external to the main inverter 150 as shown in FIG. 2. In particular, the aspects as described herein focus on the functionality of the AC source 202, the conditioning circuitry 204, and the DC supply DC supply circuitry 206 (alternatively referred to herein as a DC supply module), which is coupled to one or more of the DC PV inputs 158. Again, the main inverter may include any suitable number of both AC PV inputs 156 and DC PV inputs 158. However, for purposes of brevity, the PV panel power system 200 as shown in FIG. 2 only illustrates two example DC PV inputs 158.1, 158.2. Moreover, the functionality of the AC PV inputs and power routing by the main inverter 150 for the PV panel power system 200 is generally known, and thus is not explained in further detail herein. Aspects include the main inverter 150 including any suitable number of both AC PV inputs 156 and DC PV inputs 158, with any suitable number of the DC PV inputs 158 receiving DC power via respectively-coupled DC supply circuitry as shown in FIG. 2 for the DC PV input 158.1.

The PV panel power system 200 as shown in FIG. 2 includes the main inverter 150 as shown in FIG. 1 with additional accompanying arrows to depict how the power may be routed to the various components for ease of explanation. It will be understood that additional components, signals, and/or interconnections are not shown in FIG. 2 for purposes of brevity. For instance, the various connections as shown in FIG. 2 within the main inverter 150 may include any suitable number of both power routing connections as well as data and/or control connections between the various components. For example, the power routing control circuitry 166 may be interconnected with, communicate with, and/or control the various components of the main inverter 150 and/or other components to which the main inverter 150 is coupled. As an example, the power routing circuitry 164 as shown in FIG. 1 may be identified with the various components that are included as part of the main inverter 150 as shown in FIG. 2. Thus, the power routing control circuitry 166 may be configured to receive data from these various components associated with and/or coupled to the main inverter 150 to monitor the status of these components and/or to send control signals to these components to affect their respective states.

For example, the power routing circuitry 164 may include the DC PV inputs 158 (as well as any AC PV inputs not shown in FIG. 2), and the power routing interfaces 222, 224, which may be implemented as any suitable type of component(s) configured to selectively route power in the directions denoted by the arrows as shown in FIG. 2 in response to control signals received via the power routing control circuitry 166. The power routing interfaces 222, 224 may thus be implemented as electronically-controllable solid state relays or other suitable types of electronically-controllable switches having any suitable number and/or type of poles and throws. Additionally, the power routing circuitry 164 may include the DC-AC inverter 220, the AC-DC bridge rectifier 218, the DC-DC converters 210, 214, the DC buss 212, etc. Aspects include the power routing control circuitry 166 additionally or alternatively controlling the state of these components, which may be implemented in accordance with known circuit designs to achieve their respective functionalities, as further discussed herein.

To provide an illustrative example, the power routing control circuitry 166 may initially control the state of the DC-DC converter 210 to use the generated DC power received via the DC PV input 158.1 to charge the system batteries (battery storage 216). To do so, the power routing control circuitry 166 may cause the DC-DC converters 210, 214 to couple DC power to the battery storage 216. When the batteries are fully charged, the power routing control circuitry 166 may then control the DC-AC inverter 220 and the power routing interface 222 to convert the received DC power to AC power, which is then supplied to the load 108. Finally, when the power utilized at the load 108 is exceeded, the power routing control circuitry 166 may route the converted AC power (i.e., the output of the DC-AC inverter 220) to the grid by controlling the state of the power routing interface 224 and the auto-transfer switch 152.

Turning back to the external components as shown in FIG. 2, the AC source 202 may be implemented as any suitable source of AC power generation. For example, the AC source 202 may be implemented as a generator that utilizes any suitable type of fuel or alternate power source to generate AC electrical power at a particular frequency or range of frequencies depending upon the particular application of the main inverter 150 and/or region in which the main inverter 150 is implemented. The conditioning circuitry 204 is optional, but may be implemented as any suitable number and/or type of electromagnetic interference (EMI) filters to reduce switching noise generated by the DC supply circuitry 206. The conditioning circuitry 204 may additionally or alternatively include inrush current limiter circuitry to reduce the inrush current upon startup of the AC source 202 and/or the main inverter 150. The AC source 202 and conditioning circuitry 204 may be implemented in accordance with any suitable number and/or type of components to achieve this functionality, including known designs.

In an aspect, the DC supply circuitry 206 is configured with AC to DC conversion circuitry that functions to convert the (conditioned, filtered, etc.) AC power to DC power, which is then supplied to the DC PV input(s) 158 as shown in FIG. 2. As further discussed below, the DC supply circuitry 206 also includes one or more processors, controllers, etc., that function to adapt the AC to DC conversion circuitry to operate in accordance with the DC PV input(s) 158 and the components of the main inverter 150. In various aspects, the DC supply circuitry 206 may be implemented in accordance with any suitable DC supply architecture, components, and/or circuitry to convert AC power to DC power and regulate the DC output power by adjusting the DC current and/or DC voltage to match a predetermined I-V curve, as further discussed herein. As an example, the DC supply circuitry 206 may be implemented using power factor correction (PFC) circuitry that provides a DC power output in accordance with PFC techniques, although this is by way of example and not limitation, and the aspects herein may implement the DC supply circuitry having any suitable design as noted above.

Again, and as discussed in further detail below, the DC PV input 158.1 may, in conjunction with other components of the main inverter 150 such as the DC-DC converter 210, for instance, utilize DC power regulation techniques such as PWM or MPPT to vary the current drawn from the DC supply circuitry 206 in response to various load-changing conditions of the battery storage 216 and/or the load 108. In response, the DC supply circuitry 206 is configured to monitor or sample changes in the current that is supplied to the DC PV input 158.1 based upon this changing current draw, and to adjust the DC voltage supplied to the DC PV input 158.1 in accordance with these supplied DC current changes. Aspects include the DC supply circuitry 206 doing so by using a corresponding voltage point on a predetermined I-V curve that substantially matches or is otherwise identified with the operation of DC PV panels that are known to be compatible with the main inverter 150. In this way, the DC supply circuitry 206 converts the AC power generated by the AC source 202 to DC power that is similar to what DC PV panels would typically produce, such that the main inverter 150 may utilize this power in a manner that it ordinarily would for a connected PV DC panel.

Figure 3A:
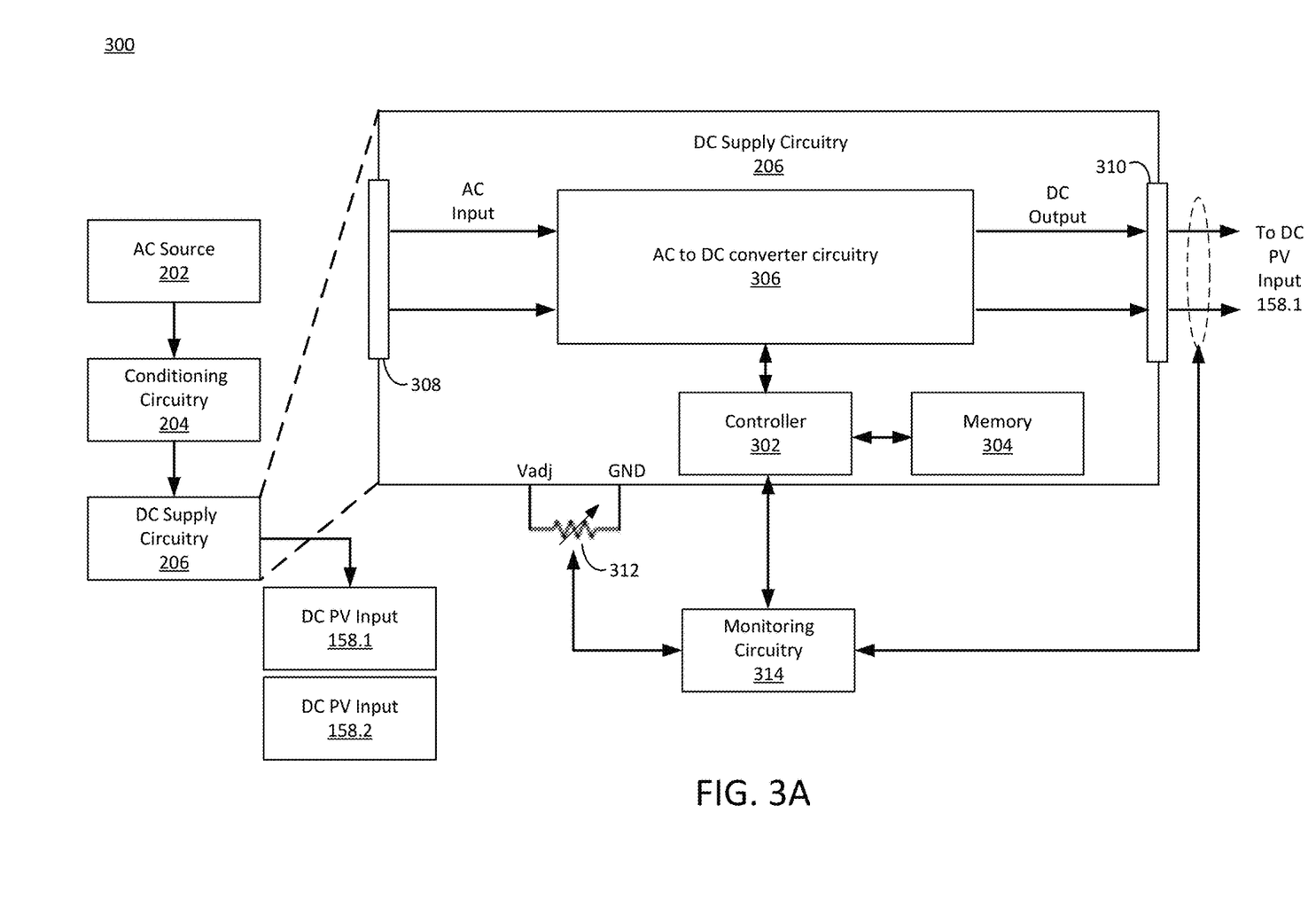
FIG. 3A illustrates a block diagram of DC supply circuitry, in accordance with one or more aspects of the disclosure.

FIG. 3A illustrates a block diagram of DC supply circuitry, in accordance with one or more aspects of the disclosure. The DC supply circuitry 206 as shown in FIG. 3A may be identified with the DC supply circuitry 206 as shown in FIG. 2, with additional detail with respect to the monitoring circuitry 314 shown in FIG. 3B. For example, the DC supply circuitry 206 may comprise a controller 302, a memory 304, AC to DC converter circuitry 306, an input or AC interface 308, and an output or DC interface 310. The input or AC interface 308 may include any suitable number of conductive terminals, pins, connections, etc., configured to couple the AC source 202 to the DC supply circuitry 206, which in this example is done by way of the conditioning circuitry 204 as discussed herein with respect to FIG. 2. Moreover, the output or DC interface 310 may likewise include any suitable number of conductive terminals, pins, connections, etc., configured to couple the supplied DC voltage generated by the AC to DC converter circuitry 306 to the PV DC inputs (e.g. 158.1, 158.2, etc.).

The various components of the DC supply circuitry 206 as shown in FIG. 3A are shown by way of example and not limitation, and the DC supply circuitry 206 may include additional, fewer, or alternate components than those shown in FIG. 3A. For instance, the controller 302 and/or the memory 304 may be external to the DC supply circuitry 206 or, as shown in FIG. 3A, be integrated as part of the DC supply circuitry 306. Moreover, the controller 302 and the memory 304 may be integrated into a common component, which may be external to the DC supply circuitry 206 or integrated as part of the DC supply circuitry 206, in various aspects.

In various aspects, the controller 302 may be implemented as any suitable number and/or type of processors, processing circuitry, and/or processing components and be configured to communicate with, exchange data with, and/or control with one or more components of the DC supply circuitry 206 and/or components external to the DC supply circuitry 206, as further discussed herein. The controller 302 may be configured to perform communications between these various components using any suitable number and/or type of communication protocols (e.g. I2C), which may be the same communication protocol when communicating with different components or different communication protocols.

The memory 304 may be implemented as any suitable type of memory storage (e.g. a non-transitory computer-readable medium) configured to store instructions, executable code, and/or any other suitable operating parameters associated with the operation and functionality of the DC supply circuitry 206, in various aspects. For instance, and as further discussed below with respect to FIG. 5, the memory 304 may store instructions executable by the controller 302 to facilitate the adjustment of the DC voltage supplied by the AC to DC converter circuitry 306 while the DC power is being supplied to the DC PV panel input 158.1. As another example, the memory 304 may store other operating parameters used to achieve this purpose, such as predetermined I-V curve data, which may be stored in accordance with a tabular format (e.g. as a look up table (LUT)) for instance, such that the DC supply circuitry 306 may adjust the supplied DC voltage to match a DC voltage point on the stored predetermined I-V curve corresponding to the sampled DC current, as further discussed below.

To do so, the controller 302 may be implemented as one or more processors, hardware, and/or software that may work in conjunction with one another or independently. For instance, the controller 302 may access the memory 304 storing programmable instructions that may be executed via any suitable number and/or type of hardware processors (e.g., an application specific integrated circuit (ASIC), a complex programmable logic device (CPLD), field programmable gate arrays (FPGAs), etc. To provide an illustrative example, aspects include the controller 302 being implemented as one or more processors configured to execute, in conjunction with processing circuitry, the various DC voltage adjustment techniques described herein with respect to the DC supply circuitry 206.

In an aspect, the controller 302 may function as or implement portions of existing or known controller types, such as a buck PFC controller, for instance, to communicate with and/or control the various functions of the AC to DC converter circuitry 306. Moreover, the DC supply circuitry 206 may function to implement portions of existing or known DC supply modules to provide AC to DC conversion functionality to output a varying range of DC voltages to the DC PV input 158.1. As an example, the DC supply circuitry 206 may be implemented as a PFC module having part number AIF04ZPFC, which is manufactured by Artesyn Embedded Technologies, Inc. of Boca Raton, Fla. However, the aspects described herein may further modify the operation of such a PFC module to facilitate the adjustment of the DC voltage as discussed herein to emulate DC voltage adjustments in accordance with the I-V curve that would be presented by a connected DC PV panel.

For example, the controller 302 may provide functionality in accordance with a buck PFC controller part number UCC29910A, manufactured by Texas Instruments, Inc. of Dallas, Tex., to control the functions of the AC to DC converter circuitry 306. In some aspects, the controller 302 may be integrated with or otherwise form part of a commercially available DC supply circuitry 206 (e.g. the aforementioned Artesyn module). In other aspects, the controller 302 may comprise a modified (e.g. via firmware modification) commercially available controller.

Figure 5:
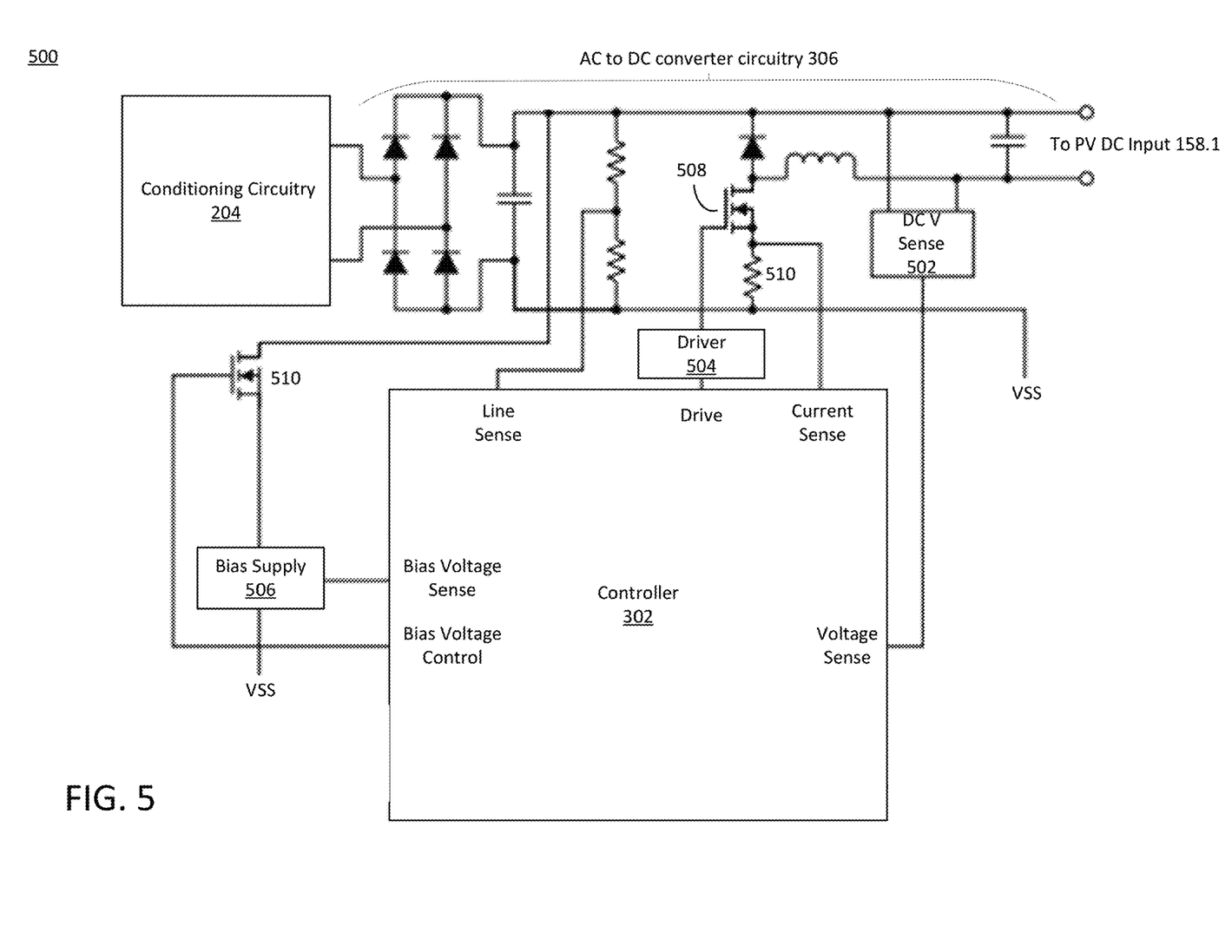
FIG. 5 illustrates a block diagram showing additional details of the DC supply circuitry, in accordance with one or more aspects of the disclosure.

However, in yet additional aspects, the controller 302 may be a customized chip solution that is configured to control and regulate the DC power output supplied by the DC supply circuitry 306, which may be implemented as any suitable type of processor and/or controller configured to execute sets of instructions to achieve the functionality as discussed herein in further detail with respect to FIG. 5. Thus, in aspects in which the controller 302 is a customized solution, the controller 302 may be external to or otherwise separate from the DC supply circuitry 206. Alternatively, and in accordance with such aspects, the controller 302 may be integrated as part of the DC supply circuitry 206. The functionality and operation of the DC supply circuitry 206 in accordance with both commercial available solutions, modified commercially available solutions, and fully custom solutions in accordance with each of these aspects is further discussed below.

For instance, for the aspects described herein in which the controller 302 is implemented as a modified or custom controller, the functionality of a buck PFC controller or other suitable type of DC supply controller may be modified and/or implemented to facilitate the adjustment of the DC voltage supplied by the AC to DC converter circuitry 306 as discussed herein, to thereby emulate DC voltage adjustments in accordance with the I-V curve that would be presented by a connected DC PV panel. As an example, aspects include the controller 302 being a custom solution that is configured to monitor the DC output voltage supplied by the DC supply circuitry 206 (e.g. via the DC voltage sense circuitry 502 as further discussed herein with reference to FIG. 5), and/or monitoring the DC current supplied by the DC supply circuitry 206 (e.g. via the current sense circuitry 510 as further discussed herein with reference to FIG. 5). In this way, the controller 302 may function to emulate the DC power in accordance with the I-V curve of DC PV panels.

Figure 3B:
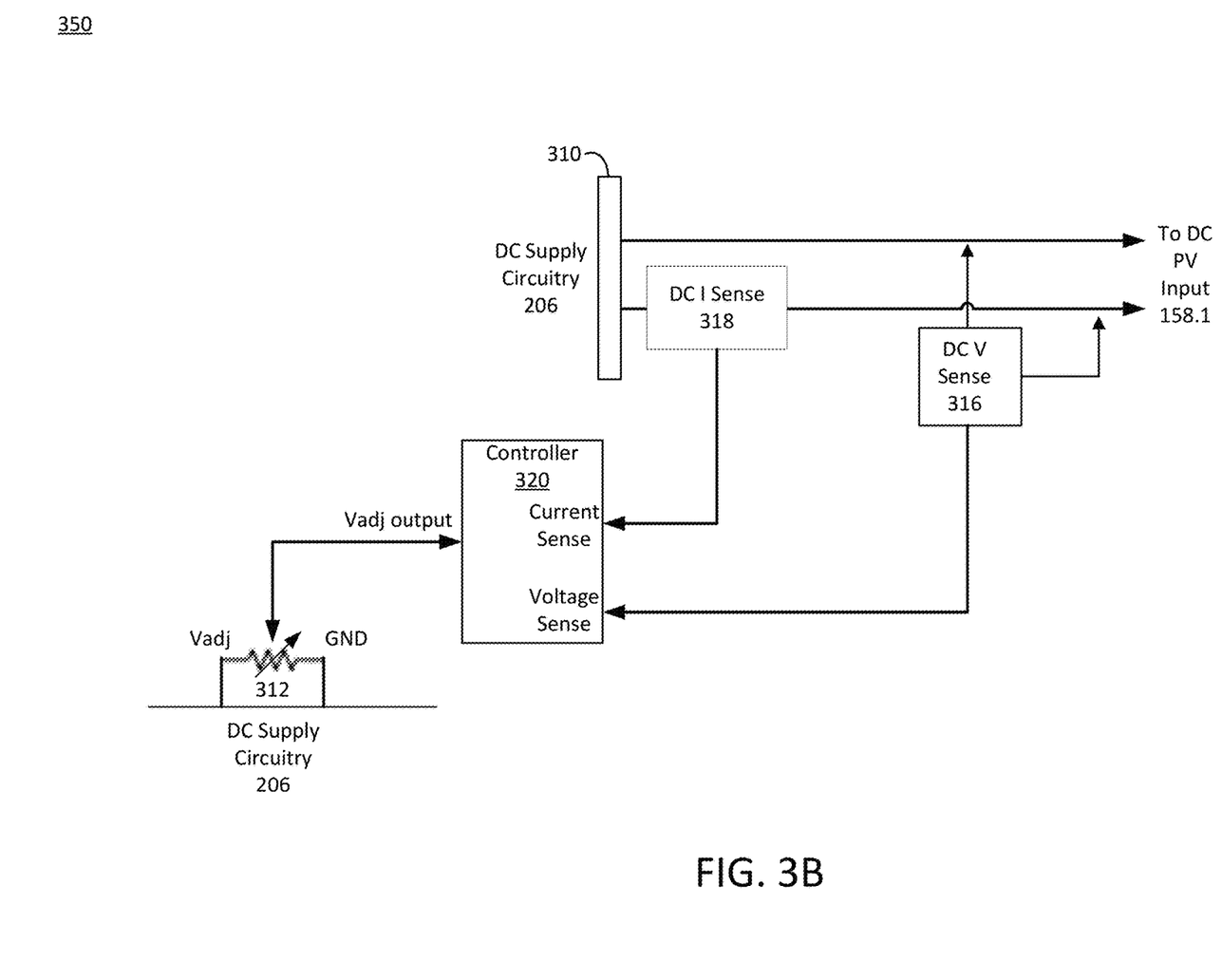
FIG. 3B illustrates an example schematic of the monitoring circuitry as shown in FIG. 3A, in accordance with one or more aspects of the disclosure.
Figure 4:
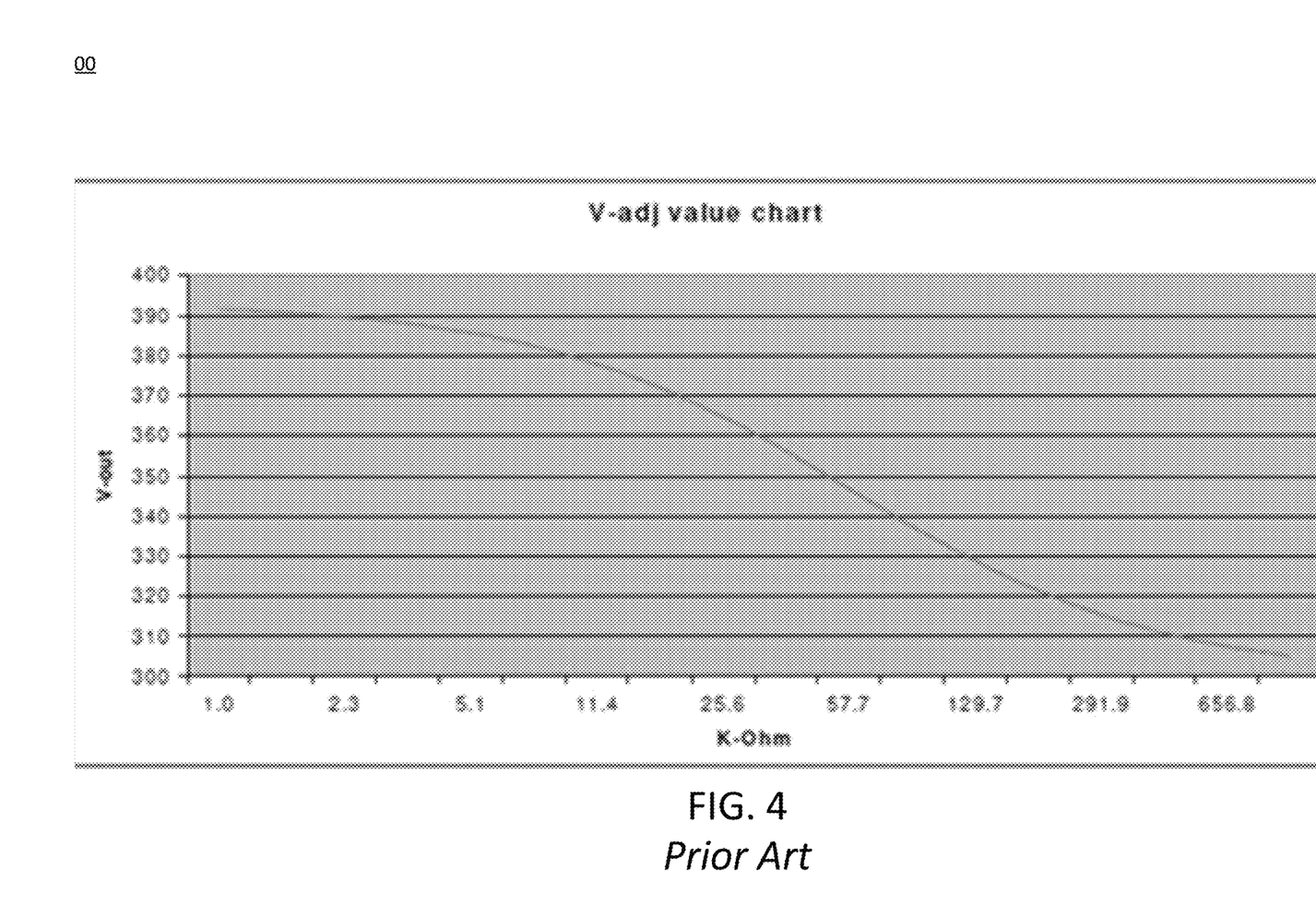
FIG. 4 illustrates a graph representing changes in the DC current and voltage output by the DC supply circuitry using changes in an external resistance value.

However, FIGS. 3A and 3B illustrate additional detail with respect to the controller 302 being implemented as an off the shelf solution as noted above. For example, in aspects in which the DC supply circuitry 206 is implemented as the aforementioned Artesyn PFC module, such modules have a voltage adjustment (Vadj) setting that allows for the adjustment of the supplied DC voltage within a range of a nominal setting. On the AIF04ZPFC PFC module, this is accomplished by connecting an external resistor between two pins having a specific value, which is shown in FIG. 3A as resistor 312. The relationship between the value of the resistor 312 connected in this arrangement and the DC voltage output by the DC supply circuitry 206 is shown in FIG. 4. Thus, aspects include the use of monitoring circuitry 314 to control a resistance value of the resistor 312, which may be implemented as an electronically adjustable resistor. The resistor 312 may thus have a resistance that is adjusted via digital control in accordance with control signals transmitted by a controller 320, which is identified with the monitoring circuitry 314, in accordance with any suitable communication protocol as shown in further detail in FIG. 3B. It is noted that commercially available solutions such as the Artesyn module as noted above use a fixed resistance value, and are not capable of adjusting the resistance of the resistor 312 in this manner.

Thus, and turning now to FIG. 3B, one option in accordance with the aspects described herein is to implement the monitoring circuitry 314, which may include a separate controller 320 configured to monitor the DC output power supplied by the AC to DC converter circuitry 306 to the DC PV input 158.1. The controller 320 may be implemented in accordance with any suitable number and/or type of processor(s) and/or controller(s) as noted above for the controller 302. Aspects include the controller 320 performing this functionality, for example, via sampling of the DC current supplied by the DC supply circuitry 206 via the DC current sense circuitry 318. The DC current sense circuitry 318 may thus be implemented with any suitable number and/or type of components (e.g. one or more resistors of known value) for the controller 320 to identify a voltage drop across the DC current sense circuitry 318, which may be performed in a manner similar or identical to the controller 302 monitoring the supplied DC current via a voltage drop across the resistor 510 as shown in FIG. 5, which is further discussed below. In response to the measured or sampled DC current, aspects include the controller 320 calculating a corresponding resistance value for the resistor 312 to match the sampled or measured DC output voltage of the DC voltage supplied by the AC to DC converter circuitry 306. This may be performed, for instance, using the DC voltage sense circuitry 316 to sample a voltage (or voltage proportional to) the DC output voltage. The DC voltage sense circuitry may include any suitable number and/or type of components to facilitate this functionality, and may do so in a manner that is similar or identical to the controller 302 monitoring the supplied DC voltage via the DC voltage sense 502 as shown in FIG. 5 and discussed herein.

Aspects include the controller 320 determining a resistance value for the resistor 312 that matches a desired look up table voltage from the sampled DC current value. In other words, the controller 320 may determine an adjusted DC voltage for the AC to DC converter circuitry 306 to output to the PV DC input in accordance with the I-V curve for a connected DC PV panel, and then set the resistance of the resistor 312 such that the controller 302 causes the AC to DC converter circuitry 306 to provide this desired DC output voltage in accordance with this resistance. Again, such aspects may be particularly useful, for instance, when the DC supply circuitry 206 is implemented as a standalone module (e.g. the aforementioned Artesyn PFC module), and the controller 302 is not used and/or the functionality of the controller 302 is unavailable for use (e.g. the controller 302 and/or its functionality are inaccessible or it is not possible to modify its functionality).

However, if the value of Vadj is simply adjusted and set, the DC output voltage of the DC supply circuitry 206 becomes a fixed value that produces a fixed DC output voltage (at least temporarily), and as discussed herein the DC output voltage needs to be adjustable based on the supplied DC current. Moreover, the use of the Vadj pin of the DC supply circuitry 206 may not provide the desired range of adjustment and/or may not facilitate a fine granular control of this DC output voltage in a manner that ensures the PV DC input is supplied with a DC voltage that accurately tracks an I-V curve that matches a connected DC PV panel. Thus, the aspects described herein may utilize alternate means of controlling the DC voltage output by the AC to DC converter circuitry 306, as further discussed below with respect to FIG. 5, for example.

FIG. 5 illustrates a block diagram showing additional details of the DC supply circuitry 206, in accordance with an aspect of the disclosure. In particular, FIG. 5 illustrates additional detail associated with the AC to DC converter circuitry 306 as shown in FIG. 3, as well as the interface between the controller 302 and the AC to DC converter circuitry 306. In the example shown in FIG. 5, the AC to DC circuitry 306 receives AC power from the AC source 206 via the conditioning circuitry 204, though again this is an optional component. Thus, the AC to DC converter circuitry 306 receives the AC voltage via the bridge rectifier circuitry as shown, and supplies the generated DC power to a DC PV panel input (PV DC input 158.1 in this example) in accordance with a DC current and a DC voltage.

The AC to DC converter circuitry 306 as shown in FIG. 5 may include any of the components shown in FIG. 5 with the exception of the controller 302 and conditioning circuitry 204, or a smaller subset of these components, in various aspects. As an example, the AC to DC converter circuitry 306 may include the arrangement of diodes, resistors, inductors, capacitors, and the transistor 508 as shown in the upper portion of FIG. 5. The other components, such as the DC voltage sense circuitry 502, the driver circuitry 504, the bias supply 506, and the transistor 510 may be incorporated as part of the DC supply circuitry 206 or external to the DC supply circuitry 206, in various aspects.

The controller 302 may interface with each of these components as shown in FIG. 5 in any suitable manner, such as via wired buses, traces, and/or interconnects. The bias supply circuitry 506 and transistor 510 are optional components, but may be present to enable the controller to regulate the bias voltage applied to one of the rails of the AC to DC converter circuitry 306 via the transistor 510, which may be particularly useful for startup conditions in accordance with known techniques. Thus, additional detail of the operation and functionality of the bias supply 506 and the transistor 510 is not provided.

In an aspect, the controller 302 is configured to monitor the DC voltage and DC current supplied by the AC to DC converter circuitry 306, and to use one or more of these monitored values to adjust the DC voltage output by the AC to DC converter circuitry 306. To do so, the architecture 500 as shown in FIG. 5 includes DC voltage sense circuitry 502, which may include any suitable number and/or type of components to facilitate the controller 302 sampling the DC voltage output generated by the AC to DC converter circuitry 306, including known techniques to do so. The DC voltage sense 502 may thus provide to the controller 302 a sampled voltage that may represent the actual DC voltage output by the AC to DC converter circuitry 306 or a voltage that is proportional to the DC voltage output by the AC to DC converter circuitry 306. In any event, the controller 302 is configured to determine the actual DC voltage output by the AC to DC converter circuitry 306 using the sampled DC voltage value.

Furthermore, the AC to DC converter circuitry includes a transistor 508 that has a gate terminal coupled to the controller 302 via the driver circuitry 504. The driver circuitry 504 may be implemented with any suitable number and/or type of components to facilitate the controller 302 driving the gate voltage of the transistor 508 to either conduct or not conduct across it drain and source terminals, including known techniques, designs, and configurations used to do so. Thus, aspects include the controller 302 modulating or changing the voltage of the gate terminal in accordance with a pulse width modulation (PWM) control technique, for instance, thereby adjusting the DC output voltage supplied by the AC to DC converter circuitry 306. In other words, the controller 302 may send control signals to the driver circuitry 504 to cause the AC to DC converter circuitry to adjust the DC voltage via pulse width modulation (PWM) control while the DC power is being supplied to the DC PV panel input 158.1.

Again, the DC power supplied by the AC to DC converter circuitry 306 has a DC voltage and a DC current. In an aspect, the controller 302 may additionally or alternatively sample the DC current supplied the AC to DC converter circuitry 306 via the voltage drop across the resistor 510 that is coupled to the drain terminal of the transistor 508. Thus, the sampled DC current may represent the actual DC current supplied by the AC to DC converter circuitry 306 or a DC current that is proportional to the DC current supplied by the AC to DC converter circuitry 306. In any event, the controller 302 is configured to determine the actual DC current output by the AC to DC converter circuitry 306 using the sampled DC current value.

Aspects include the controller 302 using the sampled DC current provided by the AC to DC converter circuitry 306 to cause the AC to DC converter circuitry 306 to adjust the DC voltage supplied to the DC PV input 158.1 while the DC power is being supplied to the DC PV input 158.1. Aspects include the controller 302 causing the AC to DC converter circuitry 306 to output a DC voltage to match a DC voltage point on a predetermined I-V curve corresponding to a point corresponding to the sampled DC current. Again, the predetermined I-V curve may be associated with a DC PV panel system that is compatible with the PV panel power system. For example, the predetermined I-V curve may represent an ideal I-V curve based upon typical DC PV panel systems, which may be determined from field studies, calibrated tests, averaged test data, etc.

The ideal I-V curve may be stored in the memory 304 as a single predetermined I-V curve (e.g. in a tabular format having any suitable level of granularity), which is to be used by the controller 102 and may be determined from test data as noted above. Alternatively, aspects include the memory 304 storing several predetermined I-V curves (e.g. in a tabular format having any suitable level of granularity). The different I-V curves may be stored in a manner such that specific DC PV panel "profiles" are identified with corresponding I-V curve data. DC PV panel profiles may include, for instance, a number of DC PV panels (or ranges of numbers of DC PV panels for corresponding I-V curve data), DC PV panel manufacturer data, regional data such as geographic location information (e.g. latitude data), etc. The DC PV panel profiles and corresponding I-V curves may be obtained via additional test data, from known properties of existing or previously installed systems, common I-V curve data available from similar types of installations in the same region, etc.

Thus, in aspects in which the controller 302 selects an appropriate predetermined I-V curve from among several stored I-V curves, this selection may be based upon one or more conditions, settings programmed during manufacture and/or installation, and/or other suitable factors. As an illustrative example, the controller 302 may communicate with one or more components of the main inverter 150, although these additional connections are not shown in the Figures for purposes of brevity. Via this communication, the controller 302 may obtain parameters with respect to the PV panel power system 200 such a manufacturer of the main inverter 150 and/or components thereof, previous or currently used DC PV panels, battery data such as a manufacturer, a number of batteries, battery capacity information, battery status (e.g. current battery level), a time of day, etc. Using one or more of these parameters, the controller 302 may select a predetermined I-V curve. For instance, if the controller 302 determines that the DC-DC converter 210 uses a specific type of MPPT implementation to charge the battery storage 216 (e.g. a known algorithm identified with a particular manufacturer), then the controller 302 may select an I-V curve that is compatible with and/or best suited to the algorithm used by DC-DC converter 210 to achieve that MPPT functionality.

In any event, although the AC source 202 may provide a stable AC voltage, the DC PV input 158.1 input may draw an amount of current from the AC to DC converter circuitry 306 that varies over time based upon changes to the load associated with the PV panel power system 200, based upon a particular phase of battery charging, etc. For example, the DC PV input 158.1 may be coupled to maximum power point tracker (MPPT) circuitry implemented by the PV panel power system 200, which may be a functional component of the DC-DC converters 210 and/or 214, for example. As part of the functionality of the MPPT circuitry, the DC PV input 158.1 may vary the amount of current drawn from the AC to DC converter circuitry 306 to track a specific I-V curve, i.e. the MPPT circuitry is configured to determine the DC current to draw from the AC to DC converter circuitry 306 in accordance with a particular identified I-V curve. Ordinarily, this I-V curve is associated with a DC PV panel system but, in this case, is actually associated with the AC to DC converter circuitry 306, which adjusts the DC voltage in a manner that emulates a DC PV panel system I-V curve. Thus, by monitoring the change in the supplied DC current via the current sampling functionality described above, aspects include the controller 302 determining the supplied DC current that is drawn by the DC PV input 158 at any point in time and/or in accordance with any suitable sampling schedule. The controller 302 may then adjust the supplied DC voltage in response to changes in the DC current such that the DC voltage supplied to the DC PV input 158.1 corresponds to a point on the predetermined I-V curve that matches the supplied DC current. This functionality is discussed further below with reference to FIG. 6A-6B.

Figure 6A:
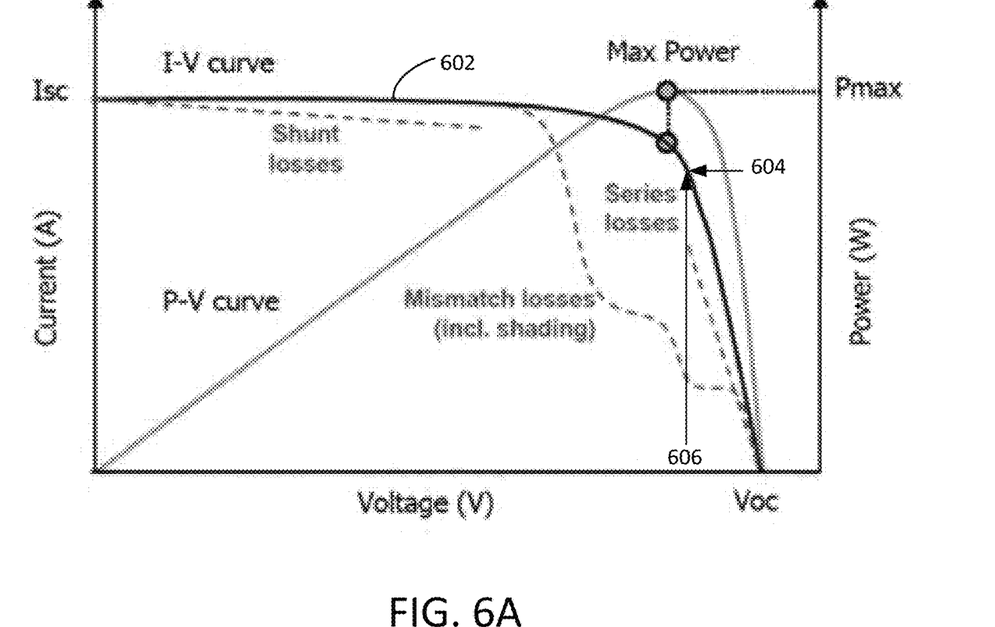
FIG. 6A illustrates an example DC voltage current-voltage characteristic (I-V) curves, in accordance with one or more aspects of the disclosure.
Figure 6B:
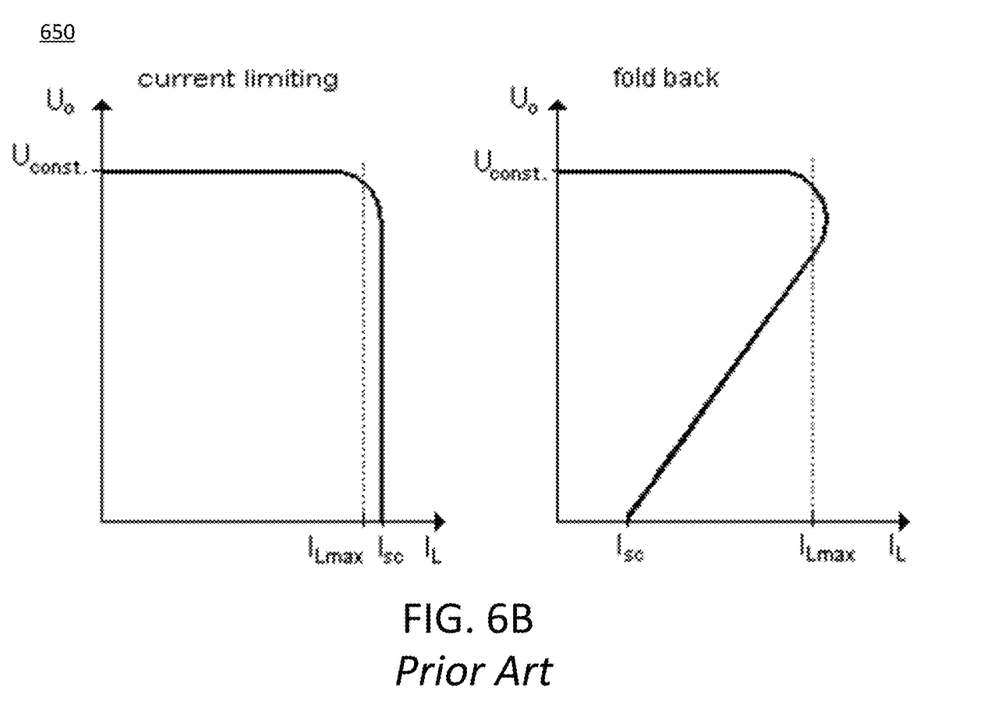
FIG. 6B illustrates an example of DC voltage current-voltage characteristic (I-V) curves for conventional AC to DC converters.

FIG. 6A illustrates example I-V curves for a DC PV panel system in accordance with aspects of the disclosure, whereas FIG. 6B illustrates example I-V curves for conventional AC to DC converters. As shown in FIG. 6A, the I-V curves for an example DC PV panel system include an ideal I-V curve 602, with other I-V curves being possible due to shunt losses and/or series losses between connected PV panels. Additionally, DC PV panel I-V curves may vary from the ideal I-V curve due to mismatch losses, which may occur when the DC PV panels are not uniformly exposed to sunlight. As is generally known, the MPPT implemented via the PV panel power system 200 monitors the maximum power point of the DC PV panels, which will vary during the day with the sun strength and angle, panel temperature, shading, panel(s) health, etc.

The MPPT circuitry then adjusts the input voltage of a corresponding DC-DC converter (e.g. DC-DC converters 210 and/or 214) to provide a matched load to the DC PV panel input 158.1 using the drawn current that is ordinarily supplied by the DC PV panels. To do so, the MPPT circuitry attempts to identify the DC PV panel I-V curve as part of this maximum power point tracking process, which may vary as noted above for the various mismatches, operating conditions, etc. MPPT systems may be configured to do so continuously or in accordance with a particular sampling schedule (e.g. once every 30 seconds, once per minute, etc.). Thus, when the I-V curve of the DC PV panel deviates significantly from the ideal I-V curve, the MPPT circuitry may require significant time and processing resources to identify the I-V curve for MPPT purposes. By implementing the DC PV panel's ideal I-V curve 602 as the predetermined I-V curve (or another suitable I-V curve in accordance with such aspects), the aspects described herein enable an efficient identification of the DC PV panel's I-V curve via the MPPT circuitry implemented by the main inverter 150, which may occur using less time and less processing resources than would be the case compared to using an actual DC PV panel system. For example, and with reference to FIG. 6A, aspects include the AC to DC converter circuitry 306 adjusting the DC output voltage to a voltage value at point 606 on the ideal I-V curve 602 in response to the DC PV input 158.1 drawing current (by way of e.g. MPPT circuitry functionality) corresponding to the current value at point 604 on the ideal I-V curve 602.

Moreover, and turning now to FIG. 6B, typical power supplies (e.g. AC to DC converters) have I-V curves that indicate current limitation or foldback as protective measures. Because MPPT circuitry is designed to move beyond the voltage limit to a point where the product I*V provides maximum power, such MPPT circuitry is not compatible with standard AC or DC power supplies. Instead, such standard power converters yield a rapid reduction in voltage, often a foldback as shown in FIG. 6B, to reduce stress on the components. Thus, the aspects described herein enable an AC to DC converter 306 to function in cooperation with MPPT circuitry implemented by PV panel power systems by using intelligent and dynamic operation that mimics the power supplied in accordance with a DC PV panel I-V curve (e.g. an ideal DC PV I-V curve). In other words, the aspects described herein enable the DC supply circuitry 206 to supply DC power to the DC PV panel input without using current limiting or foldback measures, thus ensuring compatibility with PV power panel systems (e.g. PV power panel system 200) and, more specifically, ensuring compatibility with the DC PV inputs used in accordance with such systems.

The aspects described herein use MPPT circuitry as an example of how the DC PV input 158.1 determines an amount of current to draw from the AC to DC converter circuitry 306. However, the use of MPPT circuitry by the PV power panel system 200 is by way of example and not limitation. The aspects described herein may function in accordance with a PV power panel system that implements any suitable type of PV DC control and regulation, such as PWM control for instance, which may utilize the identification and use of a specific I-V curve that the DC supply circuitry 206 may match or otherwise utilize to provide DC voltage output regulation.

Figure 7:
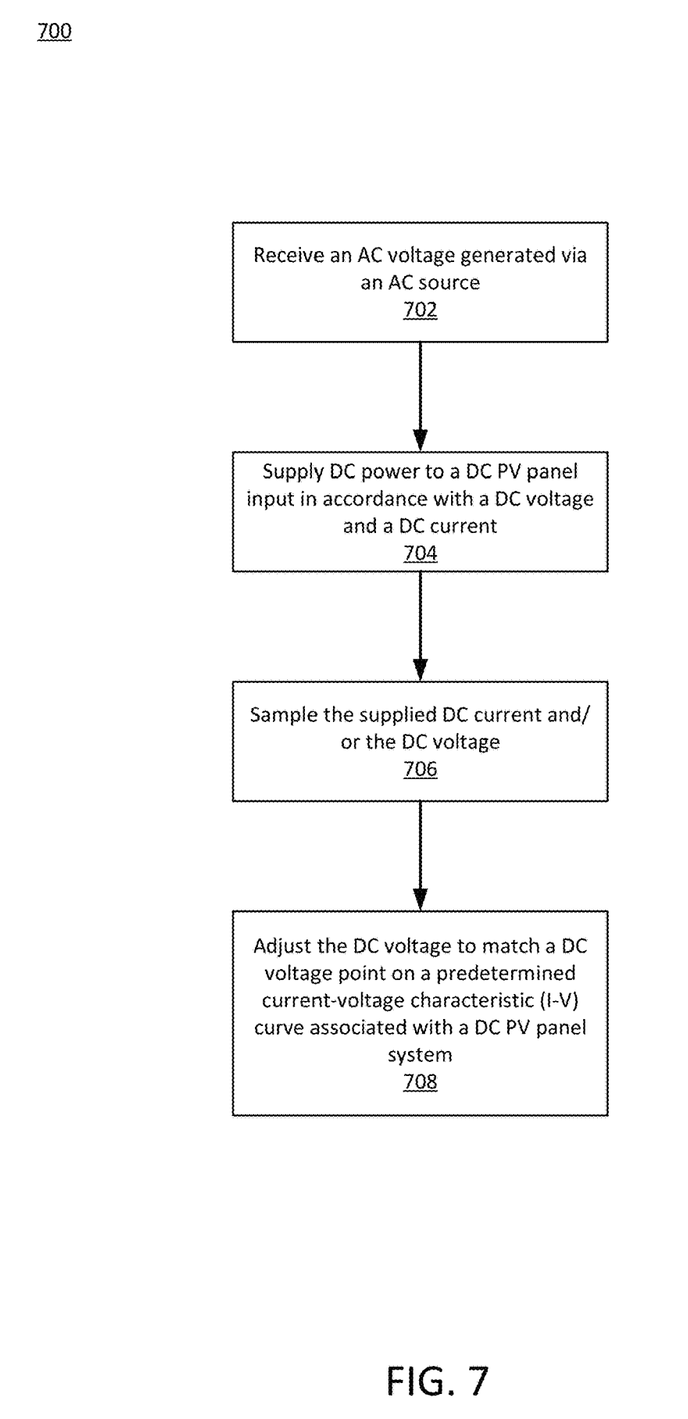
FIG. 7 illustrates an example process flow, in accordance with one or more aspects of the disclosure.

FIG. 7 illustrates an example process flow, in accordance with an aspect of the disclosure.

With reference to FIG. 7, the process flow 700 may be a computer-implemented method executed by and/or otherwise associated with one or more processors and/or storage devices. These processors and/or storage device may, for instance, be associated with the DC supply circuitry 206, the controller 302, and/or the memory 304, for example, as shown and described herein with respect to FIG. 3. In an aspect, the process flow 700 may be performed via one or more processors (e.g., the controller 302) executing instructions stored on a suitable storage medium (e.g., a non-transitory computer-readable storage medium such as the memory 304, for example) in conjunction with the DC supply circuitry 206.

Process flow 700 may begin by receiving (block 702) an alternating current (AC) voltage generated via an AC source. This may include, for example, the DC supply circuitry 206 and/or the AC to DC converter circuitry 306 receiving the AC voltage generated via the AC source 202, as discussed herein with reference to FIG. 3A for example.

Process flow 700 may include using the received (block 702) AC voltage to supply (block 704) DC power to a DC photovoltaic (PV) panel input in accordance with a DC current and a DC voltage. This may include, for instance, the DC supply circuitry 206 and/or the AC to DC converter circuitry 306 supplying the DC output voltage to the DC PV input 158.1, as discussed herein with reference to FIG. 3A for example.

Process flow 700 may include sampling (block 706) the supplied (block 704) DC current and/or the DC voltage supplied. This may include, for instance, the controller 302 sampling the DC voltage and DC current supplied by the DC supply circuitry 206 and/or the AC to DC converter circuitry 306 to the DC PV input 158.1, as discussed herein with reference to FIG. 3A for example.

Process flow 700 may include adjusting (block 708) the supplied (block 704) DC voltage using the sampled (block 706) DC current. This may include, for instance, adjusting the DC voltage supplied by the DC supply circuitry 206 and/or the AC to DC converter circuitry 306 while the DC power is being supplied by the DC output voltage to the DC PV input 158.1, as discussed herein with reference to FIG. 3A for example. The adjustment of the DC voltage in this manner may be performed to match a DC voltage associated with a point on a predetermined I-V curve corresponding to the sampled DC current that is drawn by the DC PV input 158.1 as shown in FIG. 6A for instance. Again, this predetermined I-V curve may correspond to an ideal I-V curve associated with a DC PV panel system that is compatible with a PV panel power system via the DC PV input 158.1.

CONCLUSION

The example components discussed herein are described as being associated with the power routing circuitry 164 and the power routing control circuitry 166 for ease of explanation and not by way of limitation, and such components of the power routing circuitry 164 and the power routing control circuitry 166 may be integrated as one device or separated into any suitable number of components implemented via the main inverter 150.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. Direct current (DC) supply circuitry, comprising:
an input interface configured to receive an alternating current (AC) voltage generated via an AC source;
AC to direct current (DC) converter circuitry configured to use the AC voltage generated via the AC source to supply DC power to a DC photovoltaic (PV) panel input in accordance with a DC current and a DC voltage; and
a controller configured to sample the DC current and the DC voltage supplied by the AC to DC converter circuitry, and to cause the AC to DC converter circuitry to adjust the DC voltage while the DC power is being supplied to the DC PV panel input to match a DC voltage associated with a DC voltage point on a predetermined current-voltage characteristic (I-V) curve corresponding to the sampled DC current,
wherein the DC PV panel input is associated with a PV panel power system, and
wherein the predetermined I-V curve is associated with a DC PV panel system that is compatible with the PV panel power system.

2. The DC supply circuitry of claim 1, wherein the predetermined I-V curve represents an ideal I-V curve associated with the DC PV panel system.

3. The DC supply circuitry of claim 1, wherein the DC PV panel input is coupled to a maximum power point tracker (MPPT) circuitry configured to determine the DC current to draw from the AC to DC converter circuitry as the supplied DC current, and to use the supplied DC power to charge batteries associated with the PV panel power system.

4. The DC supply circuitry of claim 3, wherein the MPPT circuitry is configured to determine the DC current to draw from the AC to DC converter circuitry in accordance with the predetermined I-V curve.

5. The DC supply circuitry of claim 1, wherein the AC to DC converter circuitry is configured to supply the DC power to the DC PV panel input without using current limiting or foldback.

6. The DC supply circuitry of claim 1, wherein the controller is configured to cause the AC to DC converter circuitry to adjust the DC voltage while the DC power is being supplied to the DC PV panel input via pulse width modulation (PWM) control.

7. The DC supply circuitry of claim 1, wherein the DC supply circuitry comprises power factor correction (PFC) DC supply circuitry, and
wherein the controller comprises a buck PFC controller.

8. A computer-implemented method in direct current (DC) supply circuitry, comprising:
receiving an alternating current (AC) voltage generated via an AC source;
supplying, using the AC voltage generated via the AC source, DC power to a DC photovoltaic (PV) panel input via AC to DC converter circuitry in accordance with a DC current and a DC voltage;
sampling the DC current and the DC voltage supplied by the AC to DC converter circuitry; and
adjusting the DC voltage while the DC power is being supplied to the DC PV panel input to match a DC voltage associated with a DC voltage point on a predetermined current-voltage characteristic (I-V) curve corresponding to the sampled DC current,
wherein the DC PV panel input is associated with a PV panel power system, and
wherein the predetermined I-V curve is associated with a DC PV panel system that is compatible with the PV panel power system.

9. The method of claim 8, wherein the predetermined I-V curve represents an ideal I-V curve associated with the DC PV panel system.

10. The method of claim 8, further comprising:
using a maximum power point tracker (MPPT) circuitry to determine the DC current for the DC PV panel input to draw from the AC to DC converter circuitry as the supplied DC current; and
using the supplied DC power to charge batteries associated with the PV panel power system.

11. The method of claim 10, wherein the act of using the MPPT tracker circuitry to determine the DC current for the DC PV panel input to draw comprises:
using the MPPT circuitry to determine the DC current to draw from the AC to DC converter circuitry in accordance with the predetermined I-V curve.

12. The method of claim 8, wherein the act of supplying the DC power to the DC PV panel input comprises supplying the DC power without using current limiting or foldback.

13. The method of claim 8, wherein the act of adjusting the DC voltage while the DC power is being supplied to the DC PV panel input comprises adjusting the DC voltage using pulse width modulation (PWM) control.

14. A non-transitory computer-readable media having instructions stored thereon that, when executed by one or more processors associated with direct current (DC) supply circuitry, cause the DC supply circuitry to:
receive an alternating current (AC) voltage generated via an AC source;
cause an AC to direct current (DC) converter circuitry to use the AC voltage generated via the AC source to supply DC power to a DC photovoltaic (PV) panel input in accordance with a DC current and a DC voltage;
sample the DC current and the DC voltage supplied by the AC to DC converter circuitry, and
cause the AC to DC converter circuitry to adjust the DC voltage while the DC power is being supplied to the DC PV panel input to match a DC voltage associated with a DC voltage point on a predetermined current-voltage characteristic (I-V) curve corresponding to the sampled DC current,
wherein the DC PV panel input is associated with a PV panel power system, and
wherein the predetermined I-V curve is associated with a DC PV panel system that is compatible with the PV panel power system.

15. The non-transitory computer-readable media of claim 14, wherein the predetermined I-V curve represents an ideal I-V curve associated with the DC PV panel system.

16. The non-transitory computer-readable media of claim 14, wherein the DC PV panel input is coupled to a maximum power point tracker (MPPT) circuitry configured to determine the DC current to draw from the AC to DC converter circuitry as the supplied DC current, and to use the supplied DC power to charge batteries associated with the PV panel power system.

17. The non-transitory computer-readable media of claim 16, wherein the MPPT circuitry is configured to determine the DC current to draw from the AC to DC converter circuitry in accordance with the predetermined I-V curve.

18. The non-transitory computer-readable media of claim 14, further having instructions stored thereon that, when executed by the one or more processors, cause the DC supply circuitry to supply the DC power to the DC PV panel input without using current limiting or foldback.

19. The non-transitory computer-readable media of claim 14, further having instructions stored thereon that, when executed by the one or more processors, cause the DC supply circuitry to cause the AC to DC converter circuitry to adjust the DC voltage while the DC power is being supplied to the DC PV panel input via pulse width modulation (PWM) control.

20. The non-transitory computer-readable media of claim 14, wherein the DC supply circuitry comprises power factor correction (PFC) DC supply circuitry, and
   wherein the one or more processors associated with the DC supply circuitry are associated with a buck PFC controller.

* * * * *